(No Model.)

C. R. FUREY.
BREAST STRAP SLIDE AND HOOK.

No. 284,547. Patented Sept. 4, 1883.

WITNESSES:
J. D. Garfield
C. Sedgwick

INVENTOR:
C. R. Furey
BY Munn & Co
ATTORNEYS.

UNITED STATES PATENT OFFICE.

CYRUS R. FUREY, OF LOGANSPORT, INDIANA, ASSIGNOR OF ONE-HALF TO JOHN H. BARNHART, OF SAME PLACE.

BREAST-STRAP SLIDE AND HOOK.

SPECIFICATION forming part of Letters Patent No. 284,547, dated September 4, 1883.

Application filed February 3, 1883. (No model.)

*To all whom it may concern:*

Be it known that I, CYRUS R. FUREY, of Logansport, in the county of Cass and State of Indiana, have invented a new and Improved Breast-Strap Slide and Hook, of which the following is a full, clear, and exact description.

My invention consists of an improvement in the contrivance of the snap of the pole-strap hook and the connection of the martingale-ring.

The snap device consists of a hook-snap pivoted in a groove of the outside of the hook, and working through a guide in the end of the hook, the said hook-snap being worked by a thumb-lever located in a chamber of the shank of the hook, from which the thumb-bit protrudes in such manner as to be effectually guarded against being accidentally shifted so as to open the snap, all as hereinafter fully described.

Reference is to be had to the accompanying drawings, forming part of this specification, in which similar letters of reference indicate corresponding parts in both the figures.

Figure 1:
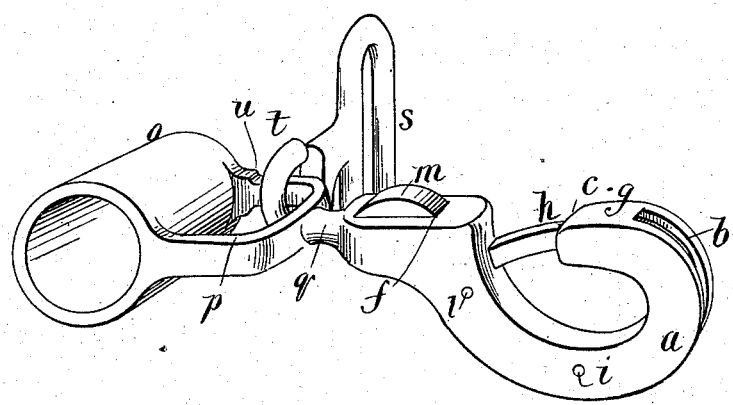
Figure 2:
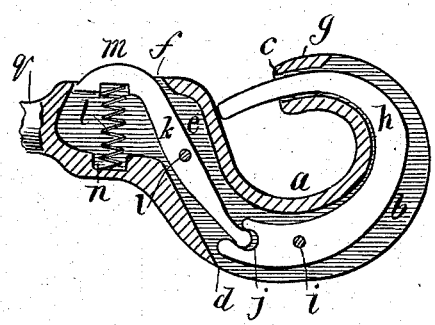

Figure 1 is a perspective view of my improved pole-strap hook and breast-strap slide; and Fig. 2 is a sectional elevation of the hook.

The hook $a$ has a groove, $b$, in the back or outside, from near the point $c$ to $d$, from which the groove is curved, forming a closed channel, $e$, therefrom to the front side of the shank, where said channel opens through the surface of the shank at $f$. The groove being covered at $g$ a short distance back of the point of the hook, said cover $g$ forms a guide to the point of a hook-snap, $h$, which is pivoted to the main hook at $i$, and is notched at $j$, in the end of its short arm, for the engagement of the inner end of the thumb-lever $k$, pivoted at $l$, and projecting up out of the opening at $f$ and terminating in an oval thumb-bit, $m$, for opening the hook-snap by pressing downward thereon. The spiral spring $n$, located under the thumb-bit, throws up the lever and thrusts out the point of the hook-snap.

It will be seen that the thumb-bit is well guarded against being accidentally pressed down by any object striking it by reason of its slight protrusion above the surface of the shank, and also because of its oval form.

It will also be seen that the hook-snap $h$ is wholly protected from strain by the main hook, and that its point is protected and guided in operation by the cover $g$.

The pole-strap slide consists of the greatly-enlarged circular bar $o$, for largely increasing the bearing-surface in contact with the pole-strap, which thereby proportionately lessens the abrasion of the leather by the bar; and said bar is cored out in the center to dispense with the unneccessary metal that the solid form of larger size than strength require would involve. This bar is connected to the shank of the hook by the bar $p$ and the neck $q$, all being cast in one piece.

It is designed to make the neck $q$ in suitable size and shape to connect the martingale-ring $s$ thereto by its hook $t$; but I also propose to connect said hook to bar $p$, as shown in the drawings, when preferred, and for the purpose of preventing the hook from chafing the pole-strap in such case, I construct the bar $p$ with shoulders $u$, to keep the hook away from the strap.

For a simple and reliable method of connecting the martingale-ring, I propose to make it of malleable metal and close down the point of its hook $t$ with a blow of a hammer after it is hooked on, so that it cannot escape.

My improved snap-hook device is alike useful for any snap-hooks, and is not limited to the pole-strap attachment.

Having thus described my invention, what I claim as new, and desire to secure by Letters Patent, is—

1. The combination, in a snap-hook, of the main hook $a$, having groove $b$ in the back, cover $g$ at the point, and chambered at the shank, and guard-hook snap $h$, pivoted in said groove, arranged in the guide $g$, and connected with the thumb-lever $k$, having an oval bit, $m$, protruding from the opening $f$ in the shank of the hook $a$, and being provided with a spring, $n$, substantially as described.

2. The combination, with the grooved hook $a$, of the pivoted snap-hook $h$, having the notched end $j$, and the spring-pressed thumb-lever $k$, having its inner end engaging with the notched end of the snap-hook, substantially as herein shown and described.

CYRUS R. FUREY.

Witnesses:
MAURICE WINFIELD,
CHARLES E. TABER.